US008543066B2

(12) United States Patent
Marklund et al.

(10) Patent No.: US 8,543,066 B2
(45) Date of Patent: Sep. 24, 2013

(54) USER EXPERIENCED REMOTE MONITORING OF A COMMUNICATIONS NETWORK

(75) Inventors: Nils Ulf Marklund, Skellefteå (SE); Alf Björn Henrik Sahlman, Skellefteå (SE); Jan Tomas Röjmyr, Skellefteå (SE)

(73) Assignee: Ascom Network Testing, Inc., Reston, VA (US)

( * ) Notice: Subject to any disclaimer, the term of this patent is extended or adjusted under 35 U.S.C. 154(b) by 290 days.

(21) Appl. No.: 12/969,005

(22) Filed: Dec. 15, 2010

(65) Prior Publication Data

US 2012/0157000 A1      Jun. 21, 2012

(51) Int. Cl.
*H04B 17/00* (2006.01)

(52) U.S. Cl.
USPC .............. 455/67.11; 455/7; 455/24; 370/252; 370/395.2; 709/223; 709/224; 709/225; 715/764

(58) Field of Classification Search
USPC ................. 455/7, 24, 67.11; 370/252, 395.2; 709/223, 224, 225; 715/764
See application file for complete search history.

(56) References Cited

U.S. PATENT DOCUMENTS

| 2004/0151127 | A1* | 8/2004 | Chong | 370/252 |
| 2006/0073786 | A1* | 4/2006 | Sarkar | 455/24 |
| 2008/0155087 | A1* | 6/2008 | Blouin et al. | 709/223 |
| 2010/0228854 | A1* | 9/2010 | Morrison et al. | 709/224 |

FOREIGN PATENT DOCUMENTS

WO     WO 2005/032186     4/2005

OTHER PUBLICATIONS

Search Report dated Jul. 2, 2012 issued in PCT counterpart application (PCT/US2011/064863).
Written Opinion dated Jul. 2, 2012 issued in PCT counterpart application (PCT/US2011/064863).

* cited by examiner

*Primary Examiner* — April G Gonzales
(74) *Attorney, Agent, or Firm* — Womble Carlyle Sandridge & Rice, LLP

(57) ABSTRACT

Various systems, computer program products, and methods are disclosed for user experienced remote monitoring of a communications network. For example, a method may include receiving air interface information from a mobile device. The air interface information may originate from signals communicated between the mobile device and the communications network. The air interface information may indicate an actual communication quality between the mobile device and the communications network. The method may further include receiving user experience information. The user experience information may indicate a perceived communication quality at the mobile device. The method may further include associating, by the server device, the air interface information and the user experience information with one another. The method may further include determining, by the server device, whether the perceived communication quality is due to the actual communication quality based on the associated air interface information and user experience information.

29 Claims, 6 Drawing Sheets

USER EXPERIENCED REMOTE MONITORING OF A COMMUNICATIONS NETWORK

FIELD OF THE INVENTION

The disclosure relates to remote monitoring of a communications network and in particular to user experienced and detailed air interface remote monitoring of a communications network.

BACKGROUND OF THE INVENTION

Conventional network communications monitors do not indicate "real-world" or production use of mobile devices. Such conventional systems typically require specialized equipment that actively tests particular portions of the communications network. However, these systems do not capture everyday use of the communications network by mobile devices. Thus, only an incomplete understanding of the performance of a communications network may be achieved with conventional systems. Other conventional systems use only basic communication quality parameters that indicate perceived communication quality at mobile devices. For example, a signal strength meter available from operating systems of mobile devices may indicate a perceived quality at mobile device based on basic quality parameters. However, for various reasons, these basic indications fail to indicate the true health or quality of the underlying network.

What is needed is remote monitoring of a communications network based on detailed air interface information that is exchanged between production mobile devices and the communications network and that indicates actual performance of the communications network. What is further needed is remote monitoring of a communications network based on user experience information that indicates a quality of performance experienced at a mobile device in order to determine whether the communications network is responsible for the quality of performance. These and other problems exist.

SUMMARY OF THE INVENTION

Various systems, computer program products, and methods are disclosed for user experienced remote monitoring of a communications network. According to various implementations of the invention, the method may include receiving, by a server device, air interface information from a mobile device, wherein the air interface information originates from signals communicated between a mobile device and the communications network, and wherein the air interface information indicates an actual communication quality between the mobile device and the communications network. The method may further include receiving, by the server device, user experience information. The user experience information indicates a perceived communication quality at the mobile device. The method may further include associating, by the server device, the air interface information and the user experience information with one another. The method may further include determining, by the server device, whether the perceived communication quality is due to the actual communication quality based on the associated air interface information and user experience information.

According to various implementations of the invention, a method of user-experienced remote monitoring of a communications network may include accessing, by a mobile device, one or more chipsets of the mobile device. The method may include collecting, by the mobile device, air interface information from signals communicated between the mobile device and the communications network via the accessed one or more chipsets. The air interface information may indicate an actual communication quality. The method may further include determining, by the mobile device, user experience information. The user experience information may indicate a perceived communication quality at the mobile device. The method may further include communicating, by the mobile device, the air interface information and the user experience information to a remote device. The air interface information and the user experience information are used to determine whether the perceived communication quality is caused by the actual communication quality.

According to various implementations of the invention, the method may include receiving, by a server device, air interface information from a mobile device, wherein the air interface information originates from signals communicated between a mobile device and the communications network, and wherein the air interface information indicates an actual communication quality between the mobile device and the communications network. The method may further include receiving, by the server device, user experience information. The user experience information indicates a perceived communication quality at the mobile device. The method may further include associating, by the server device, the air interface information and the user experience information with one another. The method may further include storing, by the server device, the associated air interface information and user experience information.

According to various implementations of the invention, the method may include receiving, by a server device, air interface information from a mobile device, wherein the air interface information originates from signals communicated between a mobile device and the communications network, and wherein the air interface information indicates an actual communication quality between the mobile device and the communications network. The method may further include receiving, by the server device, parametric user experience information and subjective user experience information. The parametric and subjective user experience information indicates a perceived communication quality at the mobile device. The method may further include associating, by the server device, the air interface information and the user experience information with one another. The method may further include determining, by the server device, whether the perceived communication quality is due to the actual communication quality based on the associated air interface information and user experience information.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

DETAILED DESCRIPTION OF THE INVENTION

Figure 1:
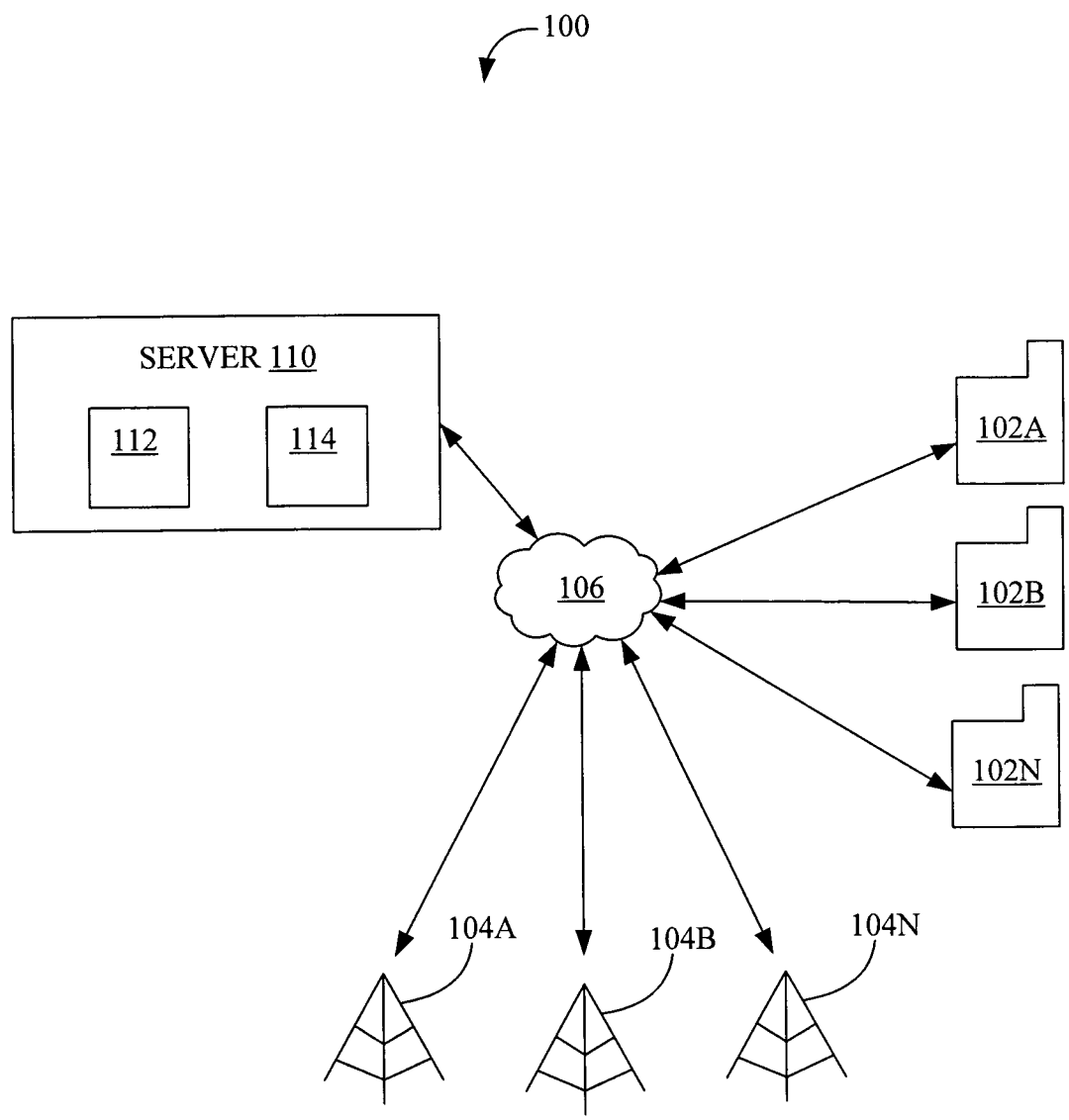
FIG. 1 is a block diagram illustrating a system of user-experienced remote monitoring of a communications network, according to various implementations of the invention.

FIG. 1 is a block diagram illustrating a system 100 of user-experienced remote monitoring of a communications network 106, according to various implementations of the invention. According to various implementations of the invention, system 100 may include, for example, mobile devices 102 (illustrated in FIG. 1 as mobile device 102A, 102B, . . . , 102N), base stations 104 (illustrated in FIG. 1 as base station 104A, 104B, . . . , 104N), a communications network 106, and a server 110. In some implementations, mobile devices 102, base stations 104, and server 110 may be communicably coupled to one another via communications network 106, which may be at least partially formed from base stations 104. Communications network 106 may include a Local Area Network, a Wide Area Network, a cellular communications network, a Public Switched Telephone Network, and/or other network or combination of networks.

According to various implementations of the invention, system 100 may determine a quality of network communication measured or perceived at mobile device 102 based on user experience information and determine whether the measured or perceived quality was due to actual quality based on air interface information. In some implementations, the user experience information and the air interface information may be associated with a device identifier and/or time identifier so that they may be correlated with one another. Thus, actual data from users of mobile devices may be logged and analyzed rather than attempting to recreate a reported problem or using different information from different mobile devices to attempt to assess communication quality.

In some instances, the actual network performance may not cause the network performance measured or perceived at mobile device 102. For example, a network performance measured or perceived at mobile device 102 such as a low signal strength indication may result from a faulty antenna of mobile device 102 rather than actual poor performance of communications network 106. In some implementations, in order to assess whether the measured or perceived quality is due to actual quality of communications network 106, server 110 may associate air interface information that is accessed from one or more chipsets of the mobile device 102. In some implementations, the air interface information may include, for example, air interface protocols, messages, parameters reported to and from mobile device 102 and a base station 104 to control network traffic, network configurations, and/or other information signaled between mobile device 102 and communications network 106. In some implementations, the signaling may include UMTS, CDMA, LTE, and/or other communication technologies. The air interface information is communicated between the mobile device 102 and a base station 104 of communications network 106 via the one or more chipsets. Thus, by accessing information at a chipset level, information communicated between mobile device 102 and base station 104 that indicates actual network quality may be used to determine whether communications network 106 was responsible for the network quality measured or perceived at mobile device 102 as indicated by the user experience information. In this manner, actual quality of communications network 106 may be assessed based on information not generally used by conventional communications network monitors.

In some implementations, mobile devices 102 may include production-level mobile devices operating on a communications network such as a cellular communications network provided by a cellular service provider. For example, mobile devices 102 may include a laptop computer, a tablet computer, a cellular phone, or other device configured to operate on communications network 106. In some implementations, users may operate mobile devices 102 in a production environment. In other words, mobile devices 102 may be operated by users for personal or business purposes during which air interface information and/or user experience information may be monitored or otherwise collected. In this manner, system 100 may remotely monitor mobile devices 102 and communications network 106 during the course of production (everyday or otherwise normal) use of mobile devices 102. In some implementations, users may operate mobile devices 102 in a testing environment. In other words, mobile devices 102 may be operated by users during testing procedures that assess the quality of communications network 106.

In some implementations, server 110 may receive air interface information from mobile device 102. In some implementations, the air interface information originates from signals communicated between mobile device 102 and communications network 106. For example, the air interface information may be exchanged between mobile device 102 and base station 104 while mobile device 102 is in communication with communications network 106. In some implementations, the air interface information indicates a communication quality between mobile device 102 and communications network 106. "Communication quality" (also used interchangeably herein with "quality of network communication") refers to a quality of network communication during an actual communication, such as a phone call or data transmission, and quality while mobile device 102 is not being used during an actual communication. In other words, so long as mobile device 102 is communicably coupled to communications network 106 and is able to execute an actual communication, a communication quality may be assessed. "Communication quality" may be used interchangeably herein with "quality of network communication."

In some implementations, server 110 may receive user experience information. In some implementations, the user experience information indicates a quality of performance perceived at mobile device 102. In some implementations, server 110 may determine a quality of performance perceived at mobile device 102 based on the user experience information.

In some implementations, the user experience information may include parametric user experience information, which may include basic indicators of network performance such as, for example, a signal strength, a battery level, and/or other basic indicators of network performance. In some implementations, the parametric user experience information may be accessed via a public Applications Programming Interface of an operating system of mobile device 102. In some implementations, the parametric user experience information may be derived or otherwise determined from air interface information. In these implementations, air interface information may be used to generate a parameter that scores the user experience. For example, information from a TCP stack together with air interface information may be used to generate a data performance quality index in order to assess a user's experience. In another example, a speech quality index may be generated based on air interface information to assess a user's experience.

In some implementations, the user experience information may include subjective user experience information, non-limiting examples of which may include a user indication of: a call being dropped, a call having poor voice quality, slow data transmission rates, and/or other user indications of network quality. In some implementations, the subjective user experience information may include one or more user ratings and/or responses to questionnaires associated with the measured/perceived quality. Such ratings may be numeric such as a rating on a scale of 0-5 of a quality of a phone call, descriptive such as "poor," "below average," "average," "good," "excellent" and so forth, and/or other ratings that reflect a user's opinion of the quality of communication at mobile device 102. In some implementations, the subjective user experience information may include responses to one or more questions posed by mobile device 102 to elicit the subjective user experience information. Thus, according to various implementations of the invention, the user experience information may indicate parametric (i.e., measured) or subjective (i.e., user opinion) quality of network performance perceived at mobile device 102. In some implementations, the user experience information may be used to determine which data sets to analyze. For example, server 110 may filter out some user experience information but not others. In this manner, only particular (such as poor) communication quality indicated by the user experience information may be analyzed.

In some implementations, server 110 may determine whether the perceived quality of performance occurred due to network quality based on the air interface information. In some implementations, server 110 may determine that communications network 106 did not cause the perceived network quality indicated by the user experience information. In other implementations, server 110 may determine that communications network 106 caused the perceived network quality. In these implementations, server 110 may drill-down to determine the root cause based on the air interface information.

In some implementations, server 110 may generate a report based on the air interface information and the user experience information. In some implementations, the report indicates or may be used to indicate whether the actual quality of communications network 106 was the cause of the network performance measured or perceived at mobile device 102. In some implementations, the report may be accessible by devices coupled to communications network 106. For example, the report may be communicated via web pages, reports directly communicated to mobile device 102, email, etc.

In some implementations, by determining the cause of the quality of network performance, server 110 may facilitate changing communications network 106 in order to address the quality. For example, server 110 may facilitate addition of new base stations 104, reconfiguration of existing base stations 104, and/or other actions that change or otherwise alter the infrastructure/configuration of communication network 106.

In some implementations, server 110 may periodically receive air interface information and user experience information. In some implementations, server 110 may store the information for later analysis. In some implementations, server 110 may correlate the received air interface information and user experience information with one another. For example, server 110 may timestamp at least one of the air interface information and user experience information and/or may use timestamps already recorded with one or both. In other implementations, server 110 may receive the air interface information and user experience information already correlated.

In some implementations, server 110 may determine whether the quality of performance occurred due to network quality based on the air interface information periodically at intervals. For example, server 110 may periodically review the received user experience information to determine a perceived quality of network performance at various times.

In some implementations, server 110 reviews user experience information that indicates a quality that does not exceed a predefined level. In this manner, server 110 may periodically analyze instances in which user experience information indicates certain levels of network performance.

For example, in some implementations, server 110 may periodically review user experience information that reflects user indications of, for example, "poor" or "below average" quality of network performance at mobile device 102. In these implementations, server 110 may analyze user experience information to determine causes of below average or poor indications of communication quality.

In some implementations, server 110 may periodically review user experience information that reflects user indications of, for example, "good" or "excellent" quality of performance at mobile device 102. In these implementations, server 110 may analyze user experience information to determine causes of good or excellent indications of communication quality.

In some implementations, server 110 may receive a triggering event that causes server 110 to determine whether the quality measured or perceived at mobile device 102 is caused by communication network 106. The triggering event may include, for example, a user indication that quality is at a particular level, a determination by mobile device 102 that quality is at a certain level, a determination by communications network 106 that quality is at a particular level, a determination that mobile device 102 is within a geographic location (or particular distance to a base station 104), and/or other event that causes server 110 to determine whether the quality measured or perceived at mobile device 102 is caused by communication network 106. In these implementations, server 110 may associate air interface information with the triggering event in order to determine whether the actual performance of communications network 106 caused a perceived quality associated with the triggering event.

In some implementations, server 110 may generate or otherwise determine work order commands to be performed by mobile device 102. The work order commands may include one or more instructions written in a programming language, plain text instructions, compiled instructions, or other instructions that cause mobile device 102 to perform various tasks. The various tasks may include, without limitation, when and what information to collect and communicate to server 110, one or more questionnaires associated with perceived quality to be posed to the user of mobile device 102, a quality ratings system to be presented to the user, and/or other instructions to be performed by mobile device 102 associated with user-experienced remote monitoring.

In some implementations, mobile device 102 may receive the work order commands and perform various tasks. In some implementations, mobile device 102 may include an installed agent operating at mobile device 102. In some implementations, the agent and/or work order commands may cause mobile device 102 to perform various tasks associated with user-experienced remote monitoring.

In some implementations, mobile device 102 may access one or more chipsets of mobile device 102. In some implementations, mobile device 102 may collect air interface information from signals communicated between mobile device 102 and communications network 106 via the accessed one or more chipsets. In some implementations, mobile device 102 communicates the air interface information to communications network 106. In some implementations, communications network 106 communicates the air interface information to mobile device 102.

In some implementations, mobile device 102 may determine user experience information. In some implementations, mobile device 102 may communicate the air interface information and the user experience information to a remote device such as server 110. In some implementations as discussed herein, server 110 may use the air interface information and the user experience information to determine whether perceived communication quality at mobile device 102 is caused by communications network 106.

In some implementations, mobile device 102 may generate a user interface configured to receive at least some of the user experience information. In some implementations, the user of mobile device 102 may use the user interface in order to indicate the user's opinion that a particular level of quality was or is experienced at mobile device 102. For example, during or after a call, the user may use the user interface to indicate poor call quality. Thus, via the user interface, mobile device 102 may receive an indication of a particular quality of communication experienced at mobile device 102. In some implementations, the particular quality indicates a poor or otherwise undesirable level of quality. In some implementations, the particular quality indicates a good or otherwise desirable level of quality.

In some implementations, the user interface may prompt the user to provide responses to one or more questionnaires. For example, the questionnaire may include questions such as, for example, "how would you rate the quality of your latest call?" or "how good was your data transfer speed?" In some implementations, the responses may be in the form of one or more ratings of the quality such as a numeric, descriptive, or other ratings. In some implementations, the user responses may include open-ended responses such as comments to be entered by the user. In this manner, via the user interface, mobile device 102 may receive one or more ratings from the user and/or other responses to questionnaires from the user.

In some implementations, the user initiates the user interface in order to report or otherwise answer questionnaires associated with the communication quality. In some implementations, mobile device 102 initiates the user interface based on an analysis of parametric user experience information. For example, mobile device 102 may determine a low signal strength indication and in response, initiate the user interface to collect subjective user experience information.

In some implementations, mobile device 102 communicates the air interface information and the user experience information periodically at intervals. For example, mobile device 102 may collect the air interface information and the user experience information periodically (such as every minute, every hour, every day, etc.). In some implementations, mobile device 102 communicates the air interface information and the user experience information substantially immediately after collecting the information. In some implementations, mobile device 102 stores the air interface information and the user experience information for later communication. In some implementations, mobile device 102 collects and/or communicates the air interface information and the user experience information together. In some implementations, mobile device 102 collects and/or communicates the air interface information and the user experience information separately. In these implementations, the air interface information and the user experience information may be collected and/or communicated independently of one another.

In some implementations, mobile device 102 communicates the air interface information and the user experience information in response to a triggering event that indicates a particular quality of communication between mobile device 102 and communications network 106. In some implementations, the triggering event may include, without limitation, an indication from the user of the particular quality of communication, a determination by mobile device 102 of the particular quality of communication based on the air interface information or the user experience information, and/or other triggering event.

In some implementations, mobile device 102 may correlate the air interface information and the user experience information and communicate the correlated air interface information and user experience information. In other words, mobile device 102 may determine which air interface information is collected or otherwise occurred when particular user experience information is collected. In this manner, air interface information may be analyzed to determine whether actual network performance caused the network performance perceived at mobile device 102.

In an example operation, mobile device 102 may collect air interface information exchanged with one or more base stations 104 of communications network 106. Mobile device 102 may further collect parametric user experience information such as a signal strength indication and/or subjective user experience information such as a user rating of communication quality. Mobile device 102 may periodically communicate the air interface information and the user experience information to server 110. These processes may execute on mobile device 102 as background processes hidden from a user operating mobile device 102.

The user may operate mobile device 102 by, without limitation, making a phone call, sending an email, receiving an email, browsing web pages, downloading content, uploading content, and/or performing other operations. During or after operating mobile device 102, the user may input the subjective user experience information. For example, the user may initiate a user interface of mobile device 102 that allows the user to input the subjective user experience information. In this example, the user may wish to report poor quality and/or view a report that describes reasons for the poor quality. In other implementations, mobile device 102 decides to initiate the user interface to prompt the user for the subjective user experience information. In this example, mobile device 102 may pop up a dialog box that prompts the user to rate or otherwise answer questionnaires associated with the quality of communication. In either case, mobile device 102 may store and periodically communicate the parametric and/or subjective user experience information to server 110.

Server 110 may receive the air interface information and the user experience information from mobile device 102 and may determine whether communications network 106 caused the communication quality experienced at mobile device 102 as indicated by the parametric user experience information. For example, server 110 may determine whether the communications network 106 caused the signal strength indication based on the air interface information. As would be appreciated based on the disclosure herein, server 110 may determine whether communications network 106 caused a plurality of communication qualities that occurred at different times at mobile device 102 as indicated by a corresponding plurality of parametric user experience information.

In implementations where server 110 receives air interface information and/or user experience information periodically, server 110 may identify which user experience information to analyze based on their corresponding qualities. In other words, server 110 may scan the user experience information to determine which ones indicate a particular quality. If the particular quality is of interest, server 110 may proceed to determine whether communications network 106 caused the particular quality based on the air interface information. For example, server 110 may review a plurality of user experience information to identify ones that indicate poor quality such as a low signal strength indication or a low rating from a user that indicates the poor quality.

In implementations where server 110 receives air interface information and/or user experience information based on triggers, server 110 may analyze the air interface information and/or user experience information associated with the triggers. For example, if a mobile device 102 or a user triggered communication of particular user experience information, server 110 may identify the particular user experience information for analysis to determine whether communications network 106 caused the quality associated with the particular user experience information.

According to various implementations of the invention, server 110 may include a processor 112, a memory 114, and/or other components that facilitate the functions of server 110 described herein. In some implementations of the invention, processor 112 includes one or more processors configured to perform various functions of server 110. In some implementations of the invention, memory 114 includes one or more tangible (i.e., non-transitory) computer readable media. Memory 114 may include one or more instructions that when executed by processor 112 configure processor 112 to perform the functions of server 110.

Figure 2:
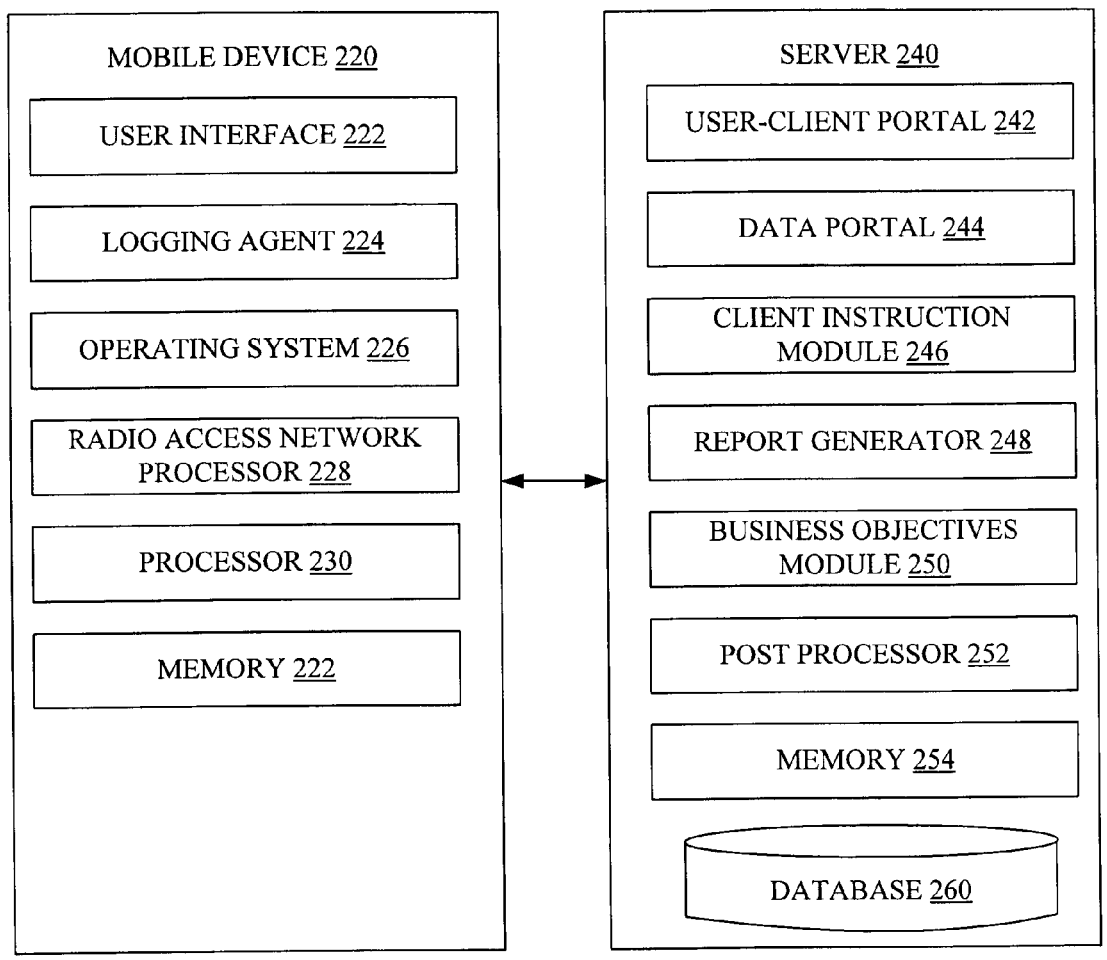
FIG. 2 is a block diagram illustrating examples of components of a server and a mobile device for user-experienced remote monitoring of a communications network, according to various implementations of the invention.

FIG. 2 is a block diagram illustrating examples of components of a server 240 and a mobile device 220 for user-experienced remote monitoring of a communications network, according to various implementations of the invention. In some implementations, through various components, mobile device 220 may collect air interface information and user experience information. In some implementations, mobile device 220 may upload either or both information to server 240. In some implementations, mobile device 220 uploads either or both information periodically and/or based on a trigger that causes the upload. In some implementations, through various components, server 240 may receive either or both information. In some implementations, server 240 may correlate the air interface information and user experience information with one another. In some implementations, server 240 receives the air interface information and user experience information already correlated. In some implementations, server 240 determines whether a communication quality indicated by user experience information is due to an actual communication quality indicated by the air interface information.

According to various implementations of the invention, mobile device 220 may include, for example, a user interface 222, a logging agent 224, an operating system 226, a radio access network processor 228 (i.e., a radio network chipset), a processor 230, and a memory 232.

In some implementations, user interface 222 may be configured to receive subjective user experience information from the user. In some implementations, user interface 222 may be initiated by the user. For example, the user may wish to report and/or determine why poor communication quality (or other quality) occurred or is occurring at mobile device 220. In some implementations, user interface 222 may be initiated by processor 230. In other words, mobile device 220 may determine poor communication quality occurred or is occurring and may prompt the user for the user's opinion.

In some implementations, user interface 222 may present one or more questionnaires that prompts for and receives input from the user regarding the communication quality. In some implementations, responses to the questionnaires may include a multiple choice format and/or open character input. In some implementations, user interface 222 may include a single input such as a "report poor quality" button. In some implementations, user interface 222 may include a multi-input such as a "report poor quality" button, "report below average quality button," and so forth.

In some implementations, logging agent 224 may determine parametric user experience information. In some implementations, logging agent 224 may collect the parametric user experience information from operating system 226. For example, operating system 226 may include or otherwise publish APIs that allow access to parametric user experience information (i.e., basic network quality information) such as a signal strength indication. In these implementations, logging agent 224 may access the APIs to collect the parametric user experience information.

In some implementations, logging agent 224 may determine air interface information by directly accessing radio access network processor 228. For example, a modified firmware for mobile device 220 may be supplied to enable accessing radio access network processor 228. In some implementations, radio access network processor 228 may include a logging function that is activated in order to make the air interface information accessible to logging agent 224. Radio access network processor 228 may include one or more chipsets responsible for processing communication between mobile device 220 and a communications network such as communications network 106 illustrated in FIG. 1. For example, radio access network processor 228 may process communication with a base station such as base station 104 illustrated in FIG. 1.

In some implementations, logging agent 224 may store the subjective user experience information, the parametric user experience information, and/or the air interface information. In some implementations, logging agent 224 may store the user experience information and/or the air interface information in memory 232. In some implementations, logging agent 224 may communicate one or more of the stored information periodically to a remote device such as to server 240. In some implementations, logging agent 224 may communicate the subjective user experience information, the parametric user experience information, and/or the air interface information as the information is collected. In some implementations, logging agent 224 may communicate the subjective user experience information, the parametric user experience information, and/or the air interface information in response to a trigger such as a command from a user, a command from processor 230, or other trigger that indicates one or more of the information should be communicated. In some implementations, memory 232 includes one or more instructions that when executed on processor 230 cause processor 230 to generate user interface 222 and/or execute logging agent 224.

According to various implementations of the invention, server 240 may include, for example, a user-client portal 242, a data portal 244, a client instruction component 246, a report generator 248, a business objective module 250, a post processor 252, a memory 254, and a database 260.

In some implementations, user-client portal 242 may be accessed by users to view reports or other information associated with communication quality determined or stored by server 240. For example, user-client portal 242 may provide web pages, other interfaces, or data through which users may access information available from server 240.

In some implementations, data portal 244 may receive parametric user experience information, subjective user experience information, and/or air interface information (one or more of which may be collectively referred to herein as "monitoring information"). For example, mobile device 220 may connect to data portal 244 or otherwise establish or receive a communication channel with mobile device 220 to receive the information.

In some implementations, client instruction component 246 may communicate one or more instructions to be executed at mobile device 220. In some implementations, the one or more instructions may include software that configures processor 230 of mobile device 220 to execute user interface 222. In some implementations, the one or more instructions may include software that configures processor 230 of mobile device 220 to execute logging agent 224. In some implementations, the one or more instructions may include one or more questionnaires to be presented to the user at mobile device 220. In some implementations, the one or more instructions may include one or more work orders by which mobile device 220 collects and/or uploads the monitoring information. For example, the one or more work orders may include, without limitation, an indication of: what types of the information to collect (such as signal strength, types of user feedback, types of air interface information), how often/when to collect the information, how often/when to upload the information, how often/when to present the questionnaires, and/or other instructions for remote monitoring of user experience and/or network information.

In some implementations, business objectives module 250 may include one or more descriptions of the business objectives of remote monitoring. In some implementations, the business objectives may affect the types of instructions communicated to mobile device 220, how/what data is handled at data portal 244, post-processing of data received at data portal 244, and/or other configurations that affect operation of server 240 and/or mobile device 220 when monitoring user experience information and air interface information. In some implementations, the business objectives may include an indication that "poor" or other quality indications from users are to be investigated by post-processor 252. In some implementations, the business objectives may include an indication of how often user experience information and/or air interface information should be collected and/or uploaded. In some implementations, the business objectives may include an indication of what geographic locations (as indicated by a base station identifier, for example) should be monitored.

In some implementations, post-processor 252 may process data received at data portal 244. In some implementations, post-processor 252 may correlate different data sources with one another. In this manner post-processor 252 may refer to appropriate data during processing. For example, in some implementations, post-processor 252 may correlate the user experience information and the air interface information. In this manner, air interface information may be used to determine whether an actual quality of a communications network caused the perceived quality indicated by the user experience information. In some implementations, post-processor 252 may correlate business objectives with incoming data (such as the monitoring information). In some implementations, post-processor 252 may identify the mobile device from which the information originated. In this manner, a particular mobile device may be monitored. In some implementations, post-processor 252 may identify the location from which the information originated. In this manner, a communications network may be monitored based on location. In some implementations, post-processor 252 may determine whether quality indicated by the user experience information is caused by the actual quality indicated by the air interface information. In some implementations, post-processor 252 may store the correlated information, identification information, location information, and/or other information. In some implementations, post-processor 252 may store the information using database 260. In some implementations, post-processor 252 may group information based on user, device groupings, and/or other groupings.

In some implementations, report generator 248 may use the post-processed information from post-processor 252 and generate reports. In some implementations, the reports display the user experience information correlated with the air interface information. For example, a "poor signal indication" by a particular mobile device at a particular time may be displayed alongside air interface information at or near the particular time. In this manner, based on the report, whether the communications network was responsible for the poor signal indication may be determined. In some implementations, the reports may provide indications of the types of information being displayed, such as whether the user experience information is parametric user experience information and/or subjective user experience information. In some implementations, report generator 248 may store the reports in a memory such as database 260.

In some implementations, the reports are accessible by users of mobile devices 220 interested in knowing why quality of network communication occurred. For example, a user may use user-client portal 242 in order to access web-based reports of the performance of mobile device 220. Based on an identity of the user and/or mobile device, for example, the user may be granted access to the reports for mobile device 220 and/or the communications network. In some implementations, the reports are accessible by users such as network system administrators troubleshooting or optimizing network configurations. In these implementations, users may view reports that associate subjective user experience information and air interface information on a location, regional, or other macro-level view. In some implementations, users may view reports based on a micro-level (i.e., reports for individual mobile devices).

Figure 3:
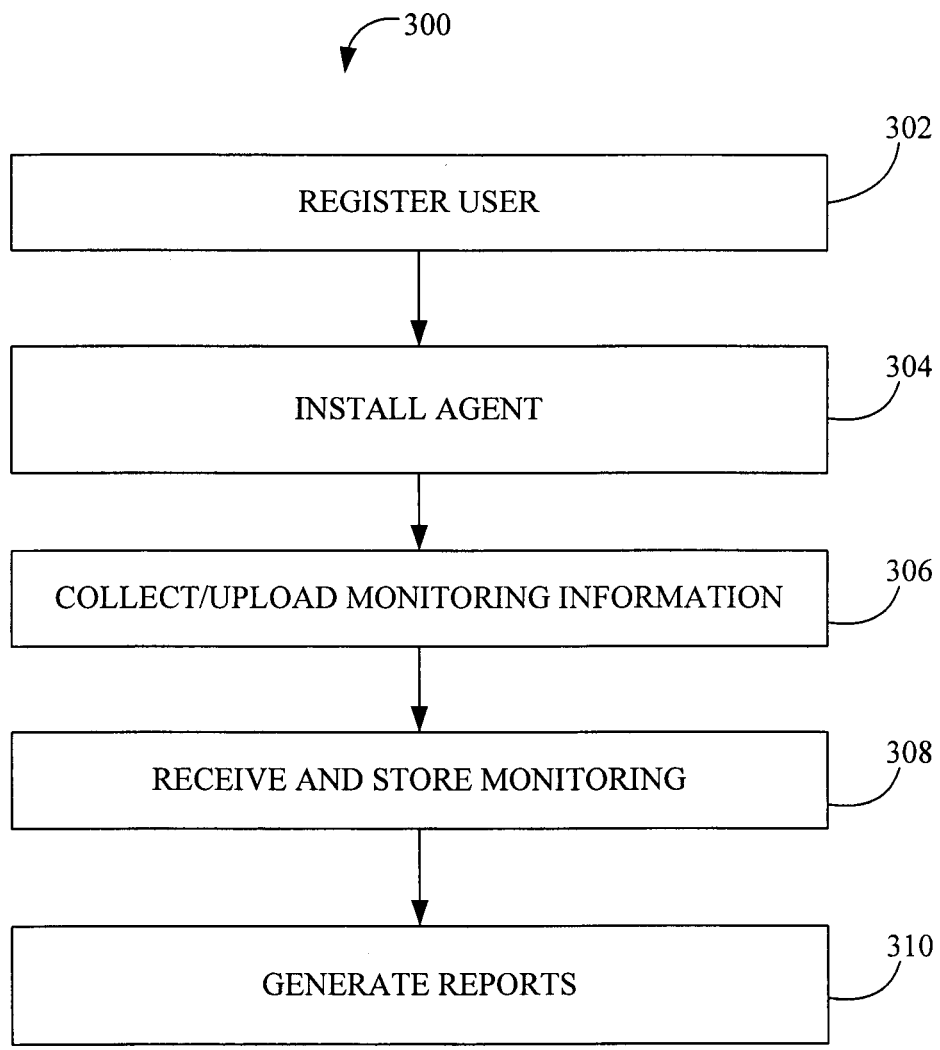
FIG. 3 is a block diagram illustrating an example of a mobile device for user-experienced remote monitoring of a communications network, according to various implementations of the invention.

FIG. 3 is a flow diagram illustrating an example process among a mobile device and a server device for user-experienced remote monitoring of a communications network, according to various implementations of the invention. The various processing operations and/or data flows depicted in FIG. 3 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In an operation 302, process 300 may register a new user. For example, process 300 may receive, from a user, basic user information such as a user name, a user address, a signed (electronically or otherwise) license agreement, a mobile device identifier, and/or other user information.

When the new user is registered, in an operation 304, process 300 may install an agent onto a mobile device of a user. The agent may include programming that causes the mobile device to generate a user interface such as user interface 222 illustrated in FIG. 2, execute a logging agent such as logging agent 224 illustrated in FIG. 2, and/or perform other suitable functions. In some implementations, while installing an agent in operation 302, process 300 may provide instructions that include settings by which the agent should operate. For example, the instructions may include: work orders that define when, where and/or how to collect and upload monitoring information, the one or more questionnaires, and/or other settings. When the agent is installed, process 300 may register the mobile device for user experienced remote monitoring.

In an operation 306, process 300 may collect and upload monitoring information. In some implementations, process 300 collects and uploads the monitoring information according to work orders or other settings received during device registration.

In an operation 308, process 300 may receive the collected and uploaded monitoring information. In some implementations where user experience information and air interface information is received, process 300 may correlate both. In some implementations, the monitoring information is stored for later analysis.

In an operation 310, process 300 may generate one or more reports. The reports may be specific to a particular mobile device, specific to a particular user who may operate multiple devices, specific to a particular location within a communications network (such as certain base stations or geographic locations of the communications network), network-wide, and/or other grouping as appropriate.

Figure 4:
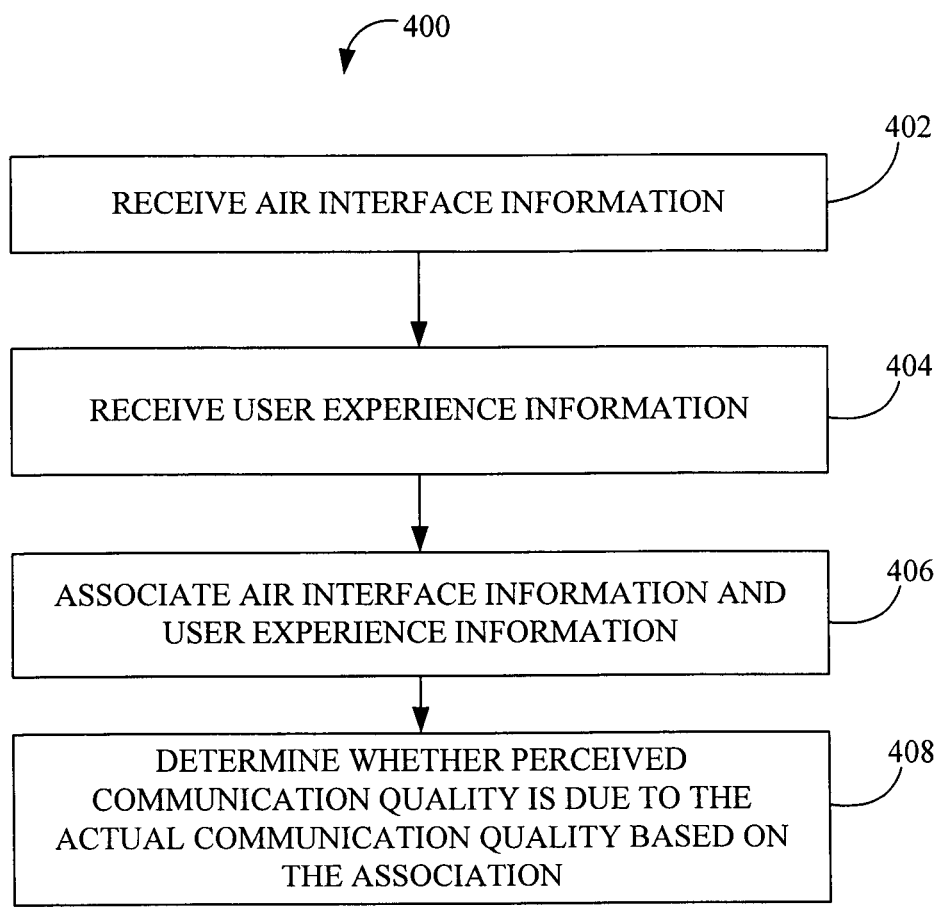
FIG. 4 is a flow diagram illustrating an example of a process of user-experienced remote monitoring of a communications network at a server, according to various implementations of the invention.

FIG. 4 is a flow diagram illustrating an example of a process of user-experienced remote monitoring of a communications network at a server, according to various implementations of the invention. In an operation 402, process 400 may receive air interface information from a mobile device. The air interface information may originate from signals communicated between a mobile device and the communications network and may indicate a communication quality between the mobile device and the communications network. In an operation 404, process 400 may receive user experience information. The user experience information may indicate a quality of performance experienced at the mobile device. In an operation 406, process 400 may determine a quality of performance at the mobile device based on the user experience information. In an operation 408, process 400 may determine whether the quality of performance occurred due to network quality based on the air interface information.

Figure 5:
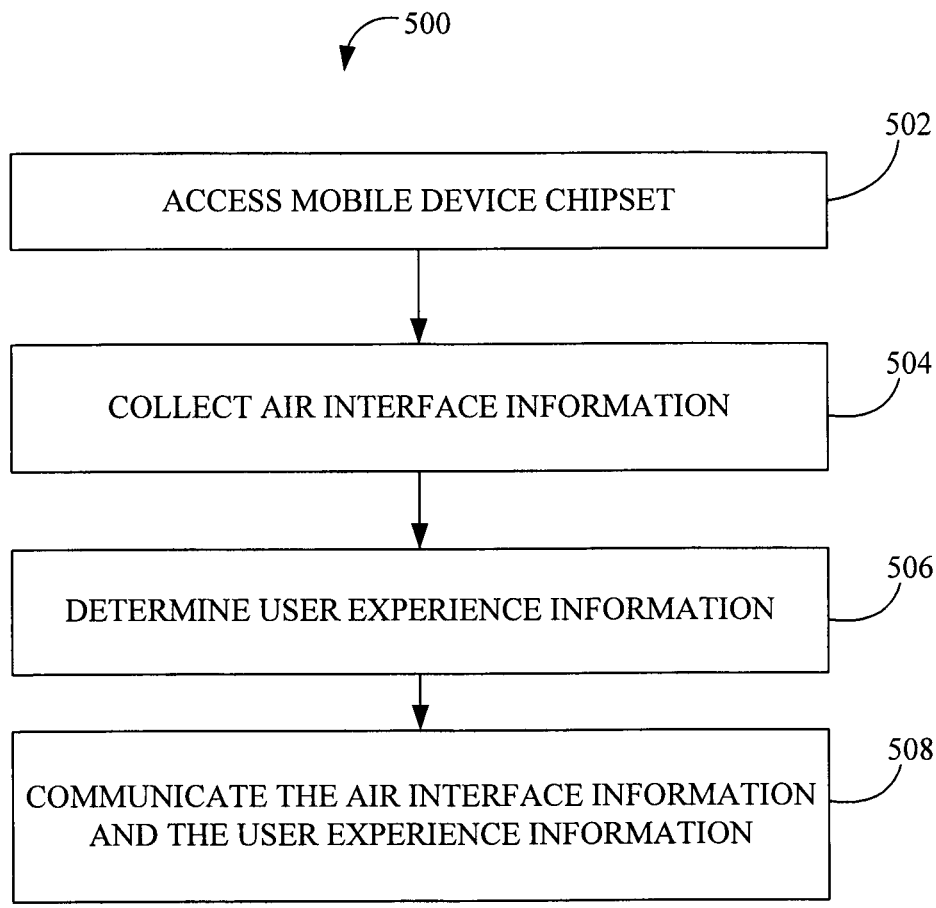
FIG. 5 is a flow diagram illustrating an example of a process of user-experienced remote monitoring of a communications network at a mobile device, according to various implementations of the invention.

FIG. 5 is a flow diagram illustrating an example of a process of user-experienced remote monitoring of a communications network at a mobile device, according to various implementations of the invention. In an operation 502, process 500 may access one or more chipsets of the mobile device. In an operation 504, process 500 may collect air interface information from signals communicated between the mobile device and the communications network via the accessed one or more chipsets. The air interface information may indicate performance of the communications network. In an operation 506, process 500 may determine user experience information. The user experience information may indicate a measured or perceived quality of performance experienced at the mobile device. In an operation 508, process 500 may communicate the air interface information and the user experience information to a remote device. The air interface information and the user experience information may be used to correlate whether communication quality at the mobile device is caused by the communications network.

Figure 6:
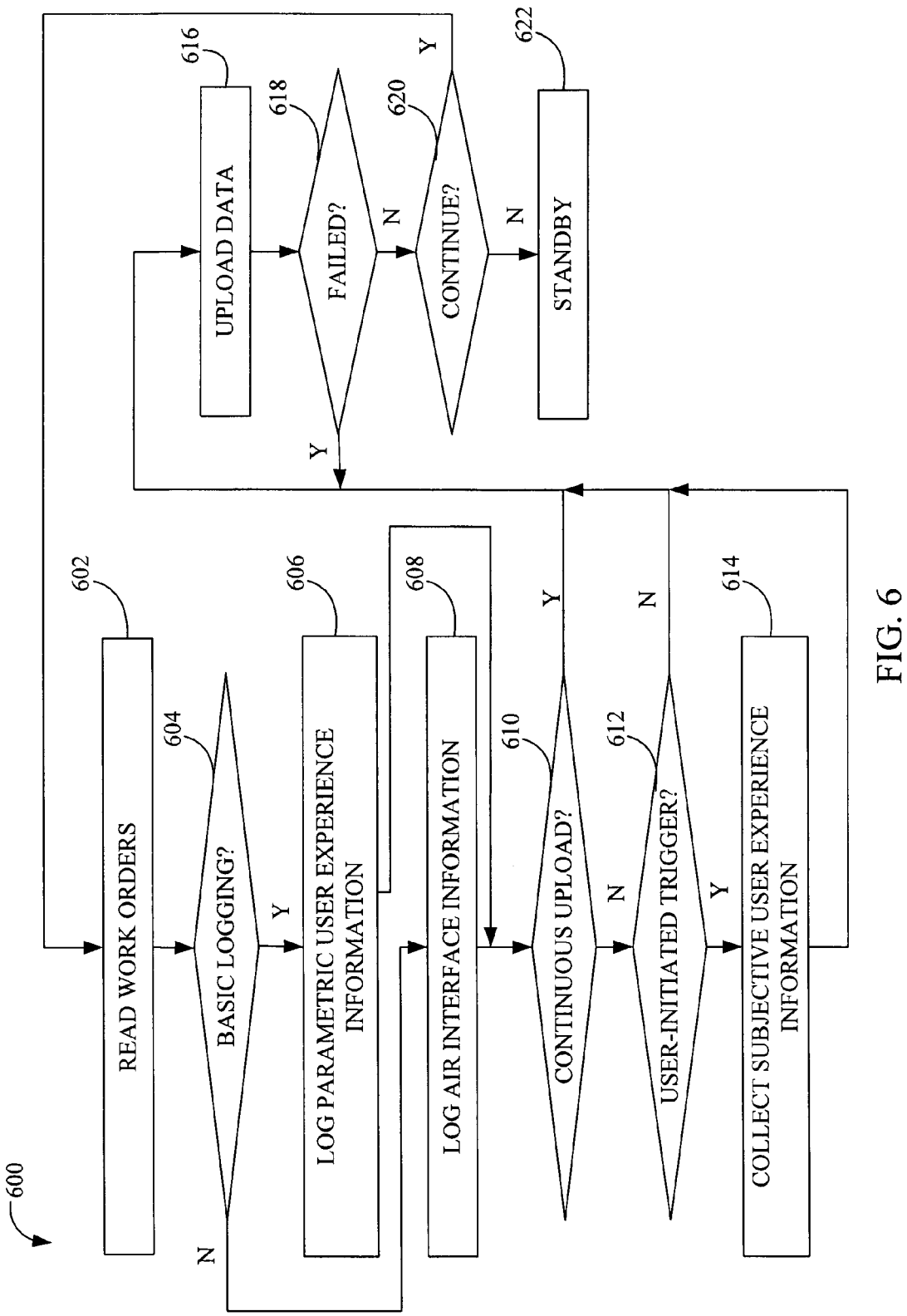
FIG. 6 is a flow diagram illustrating an example of a process of user-experienced remote monitoring of a communications network, according to various implementations of the invention.

FIG. 6 is a flow diagram illustrating an example of a process of user-experienced remote monitoring of a communications network, according to various implementations of the invention.

In an operation 602, process 600 may read work order instructions. For example, process 600 may read the setting and instructions that a system administrator has defined. The instructions may indicate a type of monitoring information to collect/upload, whether measurements should be active such as during a call or data transmission, and when to upload the data (based on a trigger or periodically).

In an operation 604, process 600 may determine whether to perform basic logging. If basic logging is specified by the work order instructions, process 600 may proceed to an operation 606, where parametric user experience information (basic information) is logged. In some implementations, the basic information is accessed from an API of the operating system of a mobile device. Process 600 may proceed to an operation 610, where a determination of whether continuous (periodic) logging is enabled according to the work order instructions.

Returning to operation 604, if basic logging is not specified, process 600 may proceed to an operation 608, where air interface information (detailed information) is logged. In operation 608, process 600 may directly connect to one or more chipsets of a mobile device in order to access and collect signaling between the mobile device and a communications network such as a cellular network. In some implementations, the air interface information may be temporarily stored for later analysis and/or upload. Upon logging the detailed information, process 600 may proceed to operation 610.

If in operation 610 continuous logging is specified, process 600 may proceed to an operation 616, where the data is uploaded. If continuous logging is not specified process 600 may proceed to an operation 612, where a determination whether upload was triggered by a user is made. If the upload was not triggered by the user, process 600 may proceed to operation 616, where the data is uploaded. If the upload was triggered by the user, process 600 may proceed to operation 614, where subjective user experience information is retrieved. For example, process 600 may cause a questionnaire to be presented to the user. The questionnaire may prompt input of the quality such as: "How did you rate the audio quality of your last call?" and "What was your experience of the last streaming video session?" In this manner, user assessment/opinion of the communication quality may be logged. Once the subjective user experience information is logged, process 600 may proceed to operation 616.

When data is uploaded in operation 616, process 600 may proceed to operation 618, where a determination whether the upload failed is made. If the upload failed, process 600 may return to operation 616, where the upload is re-attempted. If the upload did not fail, process 600 may proceed to an operation 620, where a determination whether to continue monitoring is made. If monitoring is to continue, process 600 may return to operation 602, where work order instructions are read. If monitoring is not to continue, process 600 may be suspended or terminate in an operation 622.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

The invention claimed is:

1. A computer-implemented method of user-experienced remote monitoring of a communications network, comprising:
   receiving, by a server device, air interface information from a mobile device, wherein the air interface information originates from signals communicated between the mobile device and the communications network, wherein the air interface information is collected via one or more radio access network chipsets of the mobile device, and wherein the air interface information indicates an actual communication quality between the mobile device and the communications network;
   determining, by the server device, user experience information, wherein the user experience information indicates a perceived communication quality at the mobile device;
   associating, by the server device, the air interface information and the user experience information with one another; and
   determining, by the server device, whether the perceived communication quality is due to the actual communication quality based on the associated air interface information and user experience information.

2. The computer-implemented method of claim 1, wherein receiving the air interface information comprises receiving one or more of an air interface protocol, a message or parameter reported to and from the mobile device and the communications network to control network traffic, or a network configuration.

3. The computer-implemented method of claim 1, wherein determining user experience information comprises receiving parametric user experience information that indicates the perceived communication quality, and wherein the parametric user experience information is accessed via an operating system of the mobile device.

4. The computer-implemented method of claim 3, wherein receiving parametric user experience information comprises receiving one or more of a signal strength indicator or a battery life.

5. The computer-implemented method of claim 1, wherein determining user experience information comprises receiving subjective user experience information that indicates the perceived communication quality, and wherein the subjective user experience information originates from a user of the mobile device.

6. The computer-implemented method of claim 5, wherein receiving subjective user experience information comprises receiving one or more of a user indication of the perceived communication quality, one or more ratings by the user that indicates the quality of performance, or a response to a questionnaire.

7. The computer-implemented method of claim 1, further comprising:
   identifying, by the server device, the air interface information to analyze based on the user experience information.

8. A computer-implemented method of user-experienced remote monitoring of a communications network, comprising:
   accessing, by a mobile device, one or more radio access network chipsets of the mobile device;
   collecting, by the mobile device, air interface information from signals communicated between the mobile device and the communications network via the accessed one or more radio access network chipsets, wherein the air interface information indicates an actual communication quality;
   determining, by the mobile device, user experience information, wherein the user experience information indicates a perceived communication quality at the mobile device; and
   communicating, by the mobile device, the air interface information and the user experience information to a remote device, wherein the air interface information and the user experience information are used to determine whether the perceived communication quality is caused by the actual communication quality.

9. The method of claim 8, wherein collecting the air interface information comprises collecting one or more of an air interface protocol, a message or parameter reported to and from the mobile device and the communications network to control network traffic, or a network configuration.

10. The method of claim 8, wherein the user experience information comprises parametric user experience information that indicates the perceived communication quality, and wherein determining user experience information comprises accessing an operating system of the mobile device and collecting the parametric user experience information via the accessed operating system.

11. The method of claim 10, wherein collecting the parametric user experience information comprises collecting one or more of a signal strength indicator, or a battery life.

12. The method of claim 8, wherein the user experience information comprises subjective user experience information that indicates the perceived communication quality, and wherein determining user experience information comprises:
   receiving, by the mobile device from the user, an indication of a quality of communication experienced at the mobile device.

13. The method of claim 12, wherein the user experience information comprises one or more user ratings of the quality of performance, the method further comprising:

prompting, by the mobile device in response to the indication from the user, input of the one or more user ratings; and receiving, by the mobile device, the one or more user ratings.

14. The method of claim 8, wherein the air interface information or the user experience information are communicated periodically at intervals.

15. The method of claim 8, wherein the air interface information or the user experience information are communicated in response to a triggering event that indicates a particular quality of communication between the mobile device and the communications network.

16. The method of claim 15, wherein the triggering event comprises:

receiving, by the mobile device from a user of the mobile device, an indication of the particular quality of communication.

17. The method of claim 15, wherein the triggering event comprises:

determining, by the mobile device, the perceived communication quality based on the air interface information or the user experience information.

18. The method of claim 8, wherein communicating the air interface information and the user experience information further comprising: correlating the air interface information and the user experience information and communicating the correlated air interface information and user experience information.

19. The method of claim 8, wherein collecting air interface information occurs during a production operation of the mobile device.

20. The method of claim 8, wherein collecting air interface information occurs during a testing operation of the mobile device.

21. A system of user-experienced remote monitoring of a communications network, comprising one or more servers, the one or more servers comprising:

at least one processor configured to:

receive air interface information from a mobile device, wherein the air interface information originates from signals communicated between the mobile device and the communications network, wherein the air interface information is collected via one or more radio access network chipsets of the mobile device, and wherein the air interface information indicates an actual communication quality between the mobile device and the communications network;

determine user experience information, wherein the user experience information indicates a perceived communication quality at the mobile device;

associate the air interface information and the user experience information with one another; and determine whether the perceived communication quality is due to the actual communication quality based on the associated air interface information and user experience information.

22. The system of claim 21, wherein when configured to receive the air interface information, the one or more processors further configured to receive one or more of an air interface protocol, a message or parameter reported to and from the mobile device and the communications network to control network traffic, or a network configuration.

23. The system of claim 21, wherein when configured to determine user experience information, the one or more processors further configured to: receive parametric user experience information that indicates the perceived communication quality, and wherein the parametric user experience information is accessed via an operating system of the mobile device.

24. The system of claim 23, wherein when configured to receive parametric user experience information , the one or more processors further configured to: receive one or more of a signal strength indicator, or a battery life.

25. The system of claim 21, wherein when configured to receive user experience information, the one or more processors further configured to: receive subjective user experience information that indicates the perceived communication quality, and wherein the subjective user experience information originates from a user of the mobile device.

26. The system of claim 25, wherein when configured to receive subjective user experience information, the one or more processors further configured to: receive one or more of a user indication of the perceived communication quality, one or more ratings by the user that indicates the quality of performance, or a response to a questionnaire.

27. The computer-implemented method of claim 21, the one or more processors further configured to:

identify the air interface information to analyze based on the user experience information.

28. The system of claim 21, wherein when configured to determine user experience information, the one or more processors further configured to: determine parametric user experience information based on the air interface information.

29. The system of claim 21, wherein when configured to determine user experience information, the one or more processors further configured to: receive first parametric user experience information and determine second parametric user experience information based on the first parametric user experience information.

* * * * *